United States Patent
Figge et al.

(10) Patent No.: US 8,239,598 B1
(45) Date of Patent: Aug. 7, 2012

(54) TECHNIQUES FOR TRACKING STATUS WITHIN OBJECT CHAINS

(75) Inventors: Jason Figge, Cary, NC (US); Michael Chaves, Cary, NC (US); David Brophy, Beaumaris (AU)

(73) Assignee: Teradata US, Inc., Dayton, OH (US)

( * ) Notice: Subject to any disclaimer, the term of this patent is extended or adjusted under 35 U.S.C. 154(b) by 1556 days.

(21) Appl. No.: 11/301,978

(22) Filed: Dec. 13, 2005

(51) Int. Cl.
*G06F 17/30* (2006.01)

(52) U.S. Cl. .......................................... 710/200; 714/20
(58) Field of Classification Search .................. None
See application file for complete search history.

(56) References Cited

U.S. PATENT DOCUMENTS

| | | | |
|---|---|---|---|
| 5,062,147 A * | 10/1991 | Pickett et al. ................... | 714/46 |
| 5,093,918 A | 3/1992 | Heyen et al. | |
| 5,313,630 A | 5/1994 | Namoika et al. | |
| 5,717,919 A | 2/1998 | Kodavalla et al. | |
| 6,393,419 B1 * | 5/2002 | Novak et al. ....................... | 707/8 |
| 7,302,489 B2 * | 11/2007 | Kraft .............................. | 709/230 |
| 2002/0133508 A1 * | 9/2002 | LaRue et al. ................... | 707/202 |
| 2005/0125515 A1 | 6/2005 | Dufour et al. | |
| 2005/0246687 A1 | 11/2005 | Scott | |

* cited by examiner

*Primary Examiner* — Kim Nguyen
(74) *Attorney, Agent, or Firm* — Steve McDonald

(57) ABSTRACT

Techniques are presented for tracking status within object chains. Global objects are associated with unique identifiers and each dependent local object created within the context of a particular global object receives that particular global object's identifier. A unique counter value is maintained for each status type of each global object. The local object facilitates communicating changes in its status using the received global identifier, and the counter values are updated accordingly for the affected global object.

20 Claims, 4 Drawing Sheets

US 8,239,598 B1

TECHNIQUES FOR TRACKING STATUS WITHIN OBJECT CHAINS

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright © 2005, NCR Corp. All Rights Reserved.

FIELD

The invention relates generally to data processing and more particularly to techniques for status tracking of object chains.

BACKGROUND

As more and more information is collected, housed, and analyzed within an electronic environment, timely processing that information in a useful time frame becomes more challenging. This is especially true in a business environment where often the information is interrelated, voluminous, and regularly accessed by a plurality of users.

The challenge is even more acute when a string or chain of information, which is used by a particular enterprise application, is in various states of readiness when it is needed. That is, some information may be in a draft form whereas other parts of the information may be in a production ready form.

Generally, the way this problem is handled is to manually walk the chain of information and determine the individual status for each portion of the information. As is readily apparent, walking the chain of interrelated information can entail excessive database access to retrieve each individual status and can also result in heavy processing load in order to create or walk the chain or graph associated with the information. What is more troubling, is that the entire chain or graph has to be walked for each update to the information or each time the information is to be processed as a whole unit.

Thus, it can be seen that improved status tracking and processing for information chains are desirable.

SUMMARY

In various embodiments, techniques for tracking status within object chains are provided. In an embodiment, a global identifier is associated with a global object. Next, the global identifier is passed to one or more local dependent objects, which are created within a context of the global object. Status updates are received from the one or more local dependent objects via the global identifier and a different counter is updated for each different status type associated with each of the status updates.

DETAILED DESCRIPTION

Figure 1:
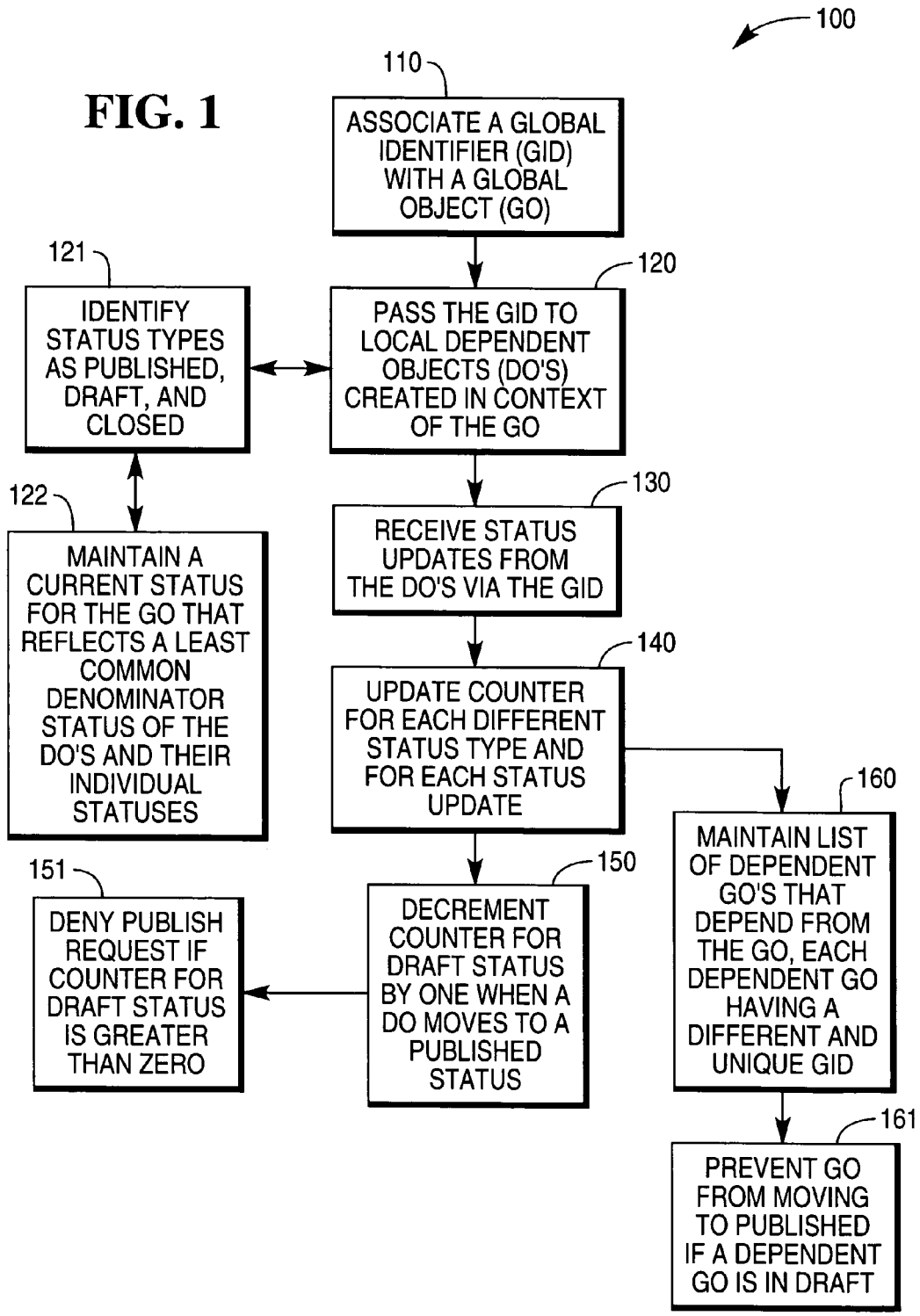
FIG. 1 is a diagram of a method for tracking status of object chains, according to an example embodiment.

FIG. 1 is a diagram of a method 100 for tracking status of object chains, according to an example embodiment. The method 100 (hereinafter "object tracking service") is implemented in a machine-accessible or computer-readable medium and is accessible over a network. The network may be wired, wireless, or a combination of wired and wireless.

Objects represent logical building blocks for an application. According to an embodiment, an object may be viewed as a record pulled from a data store or a portion of a record. The data store may be a data warehouse, a database, a directory, or any organized electronic storage. Users create and manipulate instances of objects to define how their applications will process their data. Objects can hold references to other objects. Chains or graphs of objects form a cohesive application of the user, which is capable of taking data from raw tables to build final output which may then be updated to a data store.

An object can be global or local. A global object exists on its own and is not dependent on any other object. However, it can be listed as dependent from another object within a chain of objects. But, it does not have to be made dependent on any other object. A global object can be found and referenced by any other suitable object in an application to which it is being referenced and the global object caries its own status. Moreover, global objects may be edited directly.

A local object is defined within a context of another object. In other words, it is viewed as a child of another object. Local objects are viewed and referenced via their parent object. That is, local objects are private to their parent object and track the status of their parent. Local objects are the result of either creating a new object within the context of another object or result from marking changes to a referenced global object stating that the changes are visible via the parent object. This latter process causes a completely separate object to be created and assigned the parent as a local object.

Objects may have a variety of states or statuses. In an embodiment, an object may have one of three states: a draft status, a published status, and a closed status. However, it is noted that other customized statuses may be defined and used with the teachings presented herein and that the embodiments of this invention are not limited to three statuses as defined above.

The draft status is a default state assigned to all newly created objects or new versions of existing objects (objects with changes). Users can freely change the definition of any object so long as it is in a draft state. Once an object is published (discussed below), the way to change the definition is to create a new version of the object and edit the definition for the new version. When the new version is published, it will supersede the previous version and the previous version is changed to a closed status.

A Published status of an object indicates that the object's definition has been locked down and is ready to be placed in production. Users are not able to edit the definition of a published object.

A closed status of an object indicates that the object is no longer available for use and has been expired. Users cannot use objects in a closed status. Objects may be closed for a variety of reasons, such as newer versions that fix known problems associated with previous versions, and the like.

As was stated above, users create applications having a variety of objects. These objects may be viewed as records, pieces of data, or sub applications that are in various states of readiness. Any particular application may have long and nested chains of objects. Some objects within the chain may be in a published state, which would permit the application to move to a production environment, whereas other objects in the chain may be in a draft status, which would not permit the application to move to a production environment. Before an application can move to production, each of its objects in its object chain have to be production ready; conventionally this meant that the entire object chain and each object had to be checked. This was time consuming, loaded the data store that houses the objects, and increased processing throughput.

The object tracking service represented by the FIG. 1 alleviates and streamlines object chain processing. To do this, at 110, the object tracking service associates or assigns a global identifier with each global object associated with an object chain that is being created for an application. Each global identifier is unique to a specific global object.

Moreover, at 120, and as local dependent objects are created or assembled for the object chain, the global identifier for the global object, from which a local dependent object is derived, is passed to the local dependent objects. That is, local dependent objects are created or assembled within the context of a global object. The global object includes a global identifier and that global identifier is communicated or passed to each local dependent object. The local dependent objects can use this global identifier to adjust status tracking information for the object chain, as will be discussed more fully herein and below.

According to an embodiment, at 121, the status of any particular local dependent object may be identified as published, draft, or closed. Again, if a new local dependent object is created or if a new version of an existing local dependent object is created, then the status is initially set to draft. At 122, and as will be described below, the current status of the global object may be reflected as a least common denominator status for the set of local dependent objects that are chained to the global object. So, if all but one local dependent object is in a published state and the sole holdout is in a draft state, then the current status of the entire object chain as noted via the global object is set to a draft state.

At 130, as the local dependent objects are processed and manipulated by users or interfaces, their individual statuses may change. Each local dependent object may communicate its status updates to the object tracking service via the global identifier that was communicated to the local dependent objects. The global identifier provides a reference back to a structure associated with the global object and that structure carries information that permits the object chain and the global object to dynamically carry information sufficient to determine a current status or the global object and correspondingly the object chain.

For example, at 140, the object tracking service may update a counter for each different status type that is adjusted as status updates are received. The counters may be part of a structure associated with the global object via the global identifier reference. So, a draft counter and a published counter may identify the total number of local dependent objects associated with the object chain of the global object that are in a published and draft state. A counter may not be needed for the closed state, since this information may be inferred based on values of the draft counter and the published counter. Although, a counter may also be used if desired for the closed state.

At 150, the counter associated with a draft status may be decremented by one when a local dependent object moves from a draft state to a published state. Thus, at 151, a request to publish the object chain or the global object may be denied if the draft counter includes any value greater than 0. A value of 0 would indicate that no local dependent objects in the global chain of the global object are in a draft state and thus it may be inferred (if closed status is not being tracked or accounted for) that all objects in the chain are in a published state.

According to an embodiment, at 160, the initial global object may also include other global objects nested within its object chain. In such a scenario, each global object will have its own global identifier. The object racking service may maintain a separate list or structure that identifies all the additional global identifiers that are associated with dependent global objects and a current status for each of those global objects.

Each additional global object will have its own object chain that includes counters for the status types and that may be used to determine each global object's current status. So, if the global identifier of a dependent global object is maintained, then the current lowest common denominator status for that dependent global object may be readily acquired. Thus, at 161, a global object may be prevented from moving to a published state or status if any of its dependent global objects are in a draft state or status.

Figure 4:
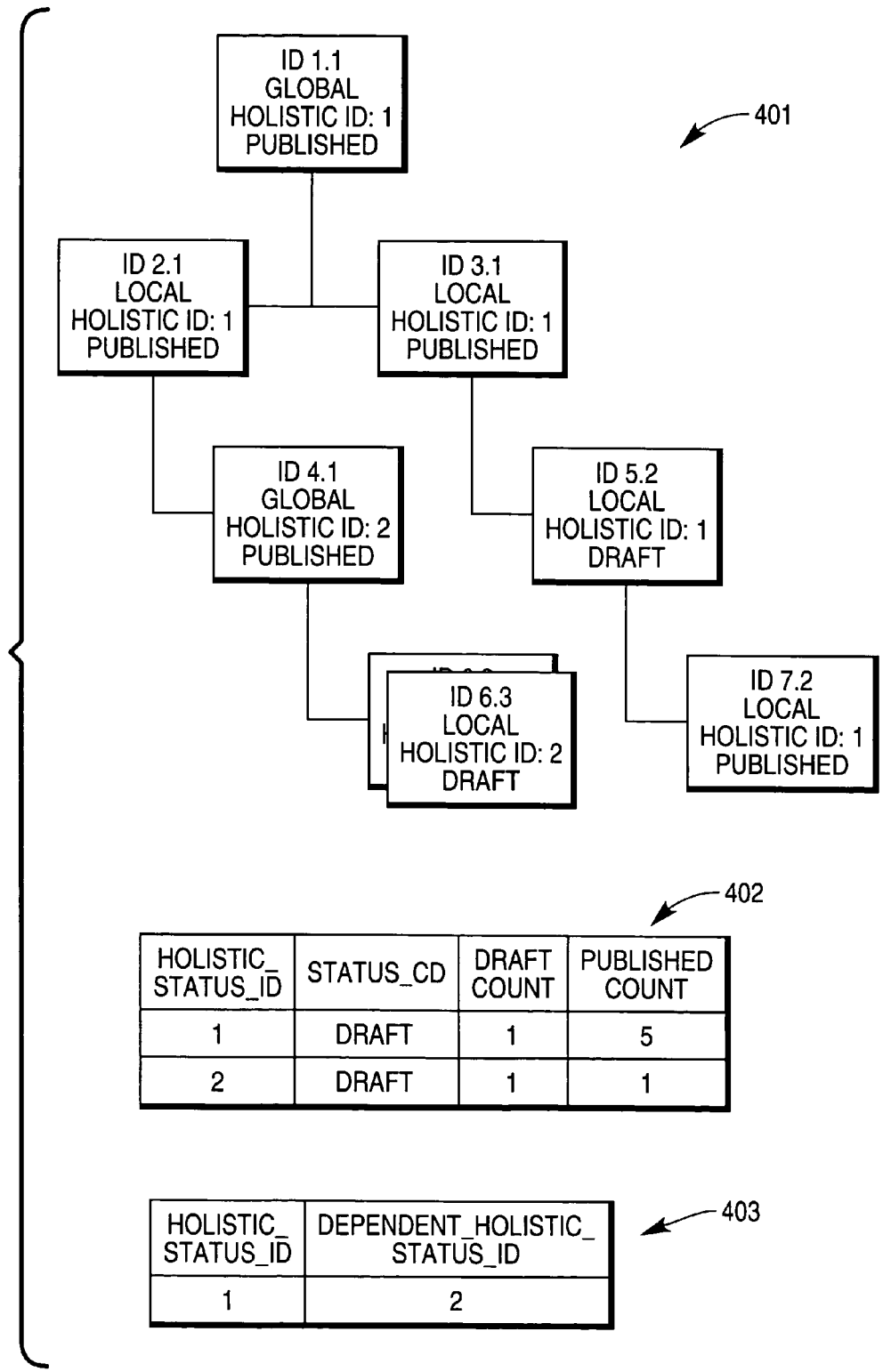
FIG. 4 is an example diagram of an object chain and corresponding tables that track status for that object chain, according to an example embodiment.

FIG. 4 provides an example object chain having dependencies that include a dependent global object. FIG. 4 also includes discussions of some of the structures that the object tracking service may maintain for each global object to readily acquire a current status for an object chain associated with that global object. Therefore, illustrations and discussions are provided and discussed with FIG. 4 below.

It is now apparent to one of ordinary skill in the art how a complex string of objects each having their own statuses may be managed from a top node or global node with one or more structures that the object tracking service dynamically manages. The structures provide an instant status for the entire object chain using a least common denominator approach. This means that the entire object chain does not have to be processed when there is a desire to publish the object chain; rather the structures can be immediately evaluated for a quick determination if publication is feasible.

Figure 2:
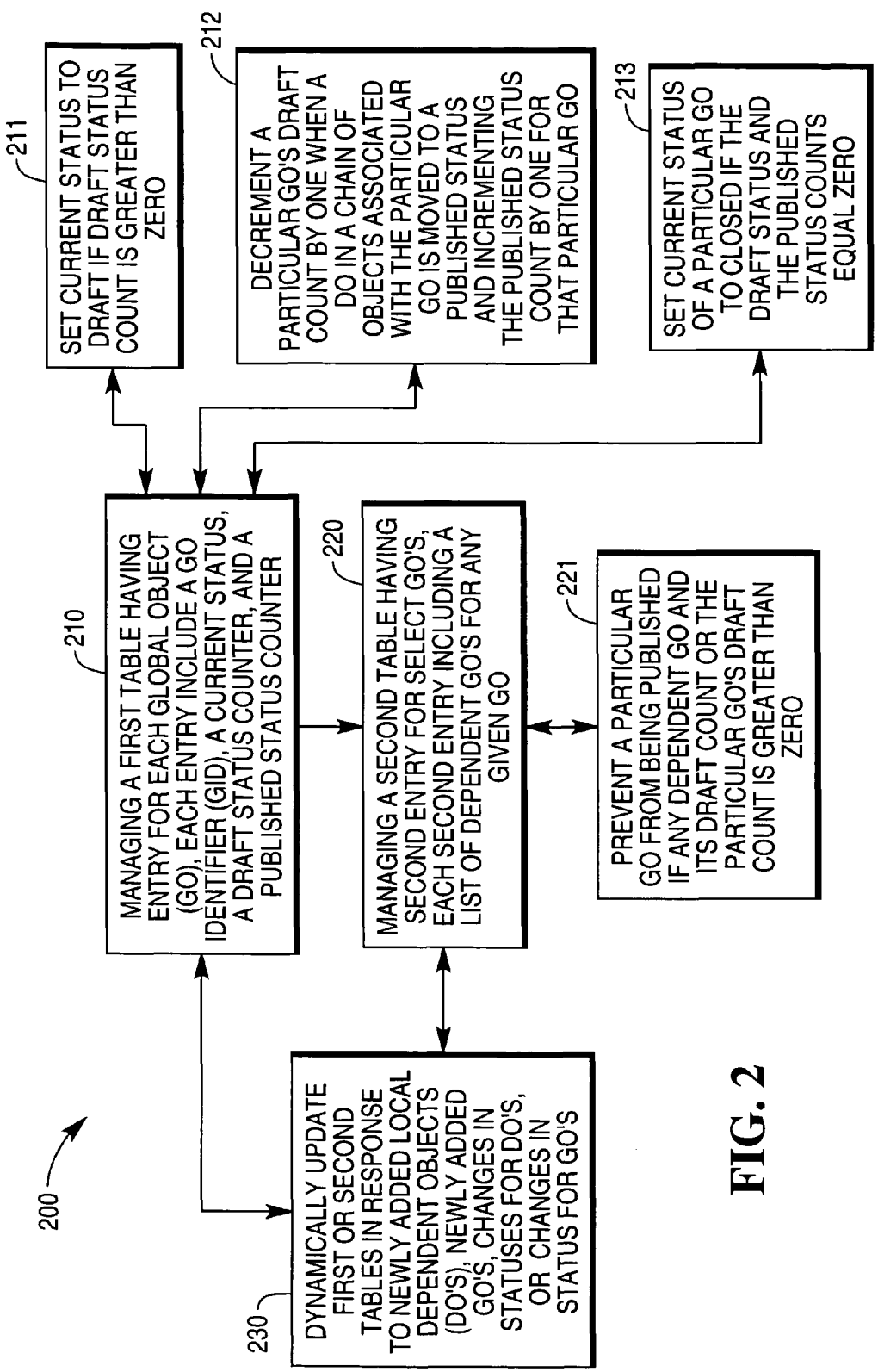
FIG. 2 is a diagram of a method for tracking status of object chains, according to an example embodiment.

FIG. 2 is a diagram of another method 200 for tracking status of object chains, according to an example embodiment. The method 200 (hereinafter "chain tracking service") is implemented in a machine-accessible and readable medium and is accessible over a network. The network may be wired, wireless, or a combination of wired and wireless. In an embodiment, the chain tracking service represents a different processing perspective of the object tracking service represented by the method 100 of FIG. 1

The chain tracking service manages two structures for an object chain. According to an embodiment, the first structure is a first table that includes N-1 counters for the total number of available statuses (N) for an object, where N is greater than or equal to 2. The second structure is a second table that includes lists of dependent global objects for a particular object chain or global object. The second table may be maintained across multiple object chains, each chain or sub chain identified by a particular global identifier for a global object.

It should also be noted that a table does not have to be used as any data structure may be used, such as a customized data object, a list, a queue, etc.

At 210, the chain tracking service manages a first table. The first table includes an entry for each unique global identifier. The global identifier is associated with a particular global object. The global object may be viewed as a root object in a chain, in some cases the global object may itself be part of other object chains.

Each entry in the first table is identified with its corresponding global identifier. Moreover, each entry includes a current status, a draft status counter, and a published status counter.

According to an embodiment, at 211, the current status for any particular entry is set to draft if the draft status counter is greater than zero. This indicates that there are objects in the object chain associated with the particular entry that are in a draft status. Each object in the chain can communicate its status when it changes or is initially set using the global identifier that is associated with the particular entry and communicated with the object is initially created or formed.

In still another embodiment, at 212, a particular global object may have its corresponding draft status count decremented by one when a dependent or local object in its object chain is moved to a published status. At the same time, a published status count is incremented by one. This allows the first table and the entry associated with a particular global object to me regularly updated to reflect changing conditions for the objects that are chained off the global object. In some cases, the published status count may not be incremented, such as when a particular object is moved from draft to a closed status.

In an embodiment, at 213, the current status of any particular global object may be set to closed, if the draft status count and the published status counts are both equal to zero.

So, a published status may be determined if the current drafts status count is zero and the current published count is equal to the total number of objects chained. A drafts status count may be determined if the current drafts status count is nonzero (lowest common denominator for the objects chained). A closed status may be determined if both the current drafts status count and published status count are set equal to zero.

At 220, the chain tracking service manages a second table. Each second table entry in the second table identifies a global object or object chain that has dependent global objects referenced within that object chain. Each entry is identified by a global identifier that global identifier includes a list of dependent global objects by referencing the dependent global objects by their global identifiers.

The second table permits sub chains within an object chain to be identified and the associated global objects checked to see what their current statuses are, such that the overall chain will assume a least common denominator status of the overall object chain.

For example, if an object chain is G1-L1-L2-G2-L3, where G is a global object and L is a dependent local object, and then even if G1-L1-L2 (sub chain) has a current status of published, the G1 will carry a current status of draft if G2 is in a draft state. This can be achieved by means of the second table that lists the G1-G2 association, and an entry for G2 in a first table will show a current status of draft. So, G1 carries the least common denominator status of draft if G2 is in a draft state.

Accordingly, at 221, any particular global object can be prevented from being published if any associated dependent global object has a draft count that is greater than zero or if the particular global object in question has a draft count that is greater than zero.

At 230, the first and second tables are dynamically updated in real time in response to objects being added to global object chains, in response to new versions being added for dependent objects, in response to new global objects being added, in response to new versions of global objects being added, or in response to changes in statuses to existing dependent objects or existing global objects.

The chain tracking service manages two tables for object chains on the basis of global identifiers. Global objects are uniquely identified with the global identifiers. As status changes counts are changed in the first table for any particular object chain, and as global objects are made dependent on existing global objects entries and modifications are made to the second table. The tables provide a mechanism by which the chain tracking service can rapidly keep track of an object chain's current status and make a determination as to whether any particular chain can be permissibly published or moved to production.

Figure 3:
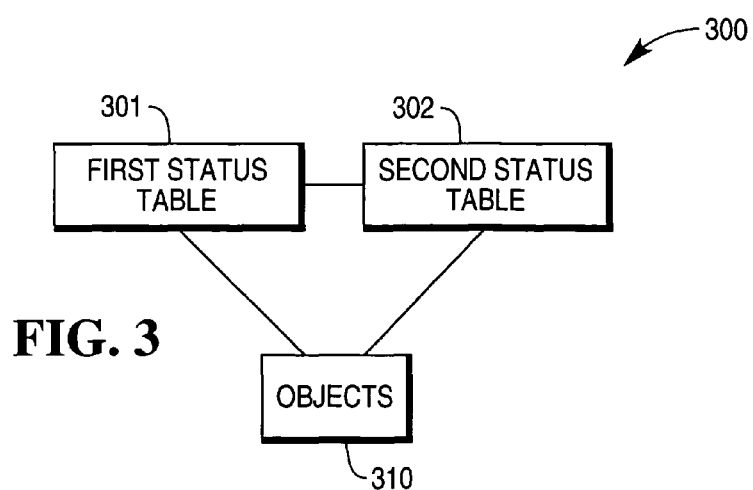
FIG. 3 is a diagram of an object chain tracking system, according to an example embodiment.

FIG. 3 is a diagram of an object chain tracking system 300, according to an example embodiment. The object chain tracking system 300 is implemented in a machine-accessible and readable medium and is operational over a network. The network may be wired, wireless, or a combination of wired and wireless. In an embodiment, portions of the object chain tracking system 300 represent, among other things data structures and results produced and managed by the methods 100 and 200 of the FIGS. 1 and 2, respectively.

The object chain tracking system 300 includes a first status table 301 and a second status table 302. These components are created, populated, and managed within a machine-accessible medium by services, such as the object tracking service and the chain tracking service represented as the methods 100 and 200 of the FIGS. 1 and 2, respectively. The first table 301 and the second table 302 will now each be discussed in turn.

The first table 301 includes a plurality of records or entries. Each entry within the first table 301 is uniquely identified by a global identifier. The global identifier is associated with a particular global object. The global object may logically be viewed as an independent chain of objects 310 being used in an application.

Additionally, each entry of the first table 301 includes a current status, a draft counter value, and a published counter value. From this information and its current value a third status may be determined, such as a closed status, as was described above. It should also be noted that the first table 301 need not carry, in all instances, the current status, since this information may be derived from values associated with the draft counter value and the published value counter. That is, if the draft counter value is greater than zero than the current status for a particular entry may be assumed to be a draft status. Moreover, if the draft counter value is zero and the published counter value is equal to a total number of objects 310 chained then a published status may be inferred. Also, if both the draft counter value and the published counter value are zero then a closed status may be inferred.

The counter values are dynamically updated as objects 310 within a particular object chain are added or modified, such that their individual states change. The objects 310 can communicate these changes my means of the global identifier and the global identifier can be used to find the appropriate entry in the first table 301.

The second table 302 links first global identifiers with other remaining global identifiers if those other remaining global identifiers depend from the first global identifiers. That is, if a particular global identifier includes one or more global objects (also represented by global identifiers) within part of its object chain, then the second table 302 includes a single indexed entry for the particular global identifier and links the dependent global identifiers within that entry. Examples of the second table 302 are provided below with the discussion of FIG. 4.

Any particular global object is not permitted to move to a published status if there are dependent global objects associated with it in the second table 302 that are in draft statuses. So, a global object cannot move to production if it has a non zero drafts counter value in the first table 301 or if it has a dependent global object in the second table 302 that has a drafts counter value, which is greater than zero.

As dependent local objects are created, the drafts counter value for the associated global object within the first table 301 is incremented by one, since a new object is initially set to a draft state. This may also occur when a new version of an existing local dependent object is created.

The object chain tracking system 300 includes two tables 301 and 302 that are created and managed dynamically and in real time by an object tracking service and/or a chain object tracking service, which were represented by the methods 100 and 200 of the FIGS. 1 and 2, respectively. The tables 301 and 302 permit real time resolution of an object chain's current status.

FIG. 4 is an example diagram of an object chain and corresponding tables that track status for that object chain, according to an example embodiment. The diagram is presented for purposes of illustration only and is not intended to limit the teachings presented herein.

FIG. 4 visually depicts an object chain 401 having two global objects represented by the Holistic id 1 and 2. Any local dependent object derived from a global object retains its global object's Holistic id. It can be seen from the FIG. 4 that Global object 1.1 also includes another sub object chain represented by the global object having a Holistic id of 2. Global object 1.1 includes an object chain of 1.1→2.1→3.1→4.1→5.2→6.3→7.2. Global object 4.1 includes an object chain of 4.1→6.3.

Table 402 may be viewed as the first table 301 discussed above with the object chain tracking system 300 of the FIG. 3. Here it can be seen that Global object 1.1 represented by global identifier 1.1 is in a draft status and has a draft count of 1 and a published count of 5. The Global object 4.1 represented by global identifier 2 is also in a draft status having a draft count of 1 and a published count of 1.

Notice that even if local dependent object 5.2 were to move to a published state that Global object 1.1 would not move to published because dependent Global object 4.1 represented by global identifier 2 is in a draft state and a second table 403 shows the dependency. The second table 403 may be viewed as the second table 302 discussed above with the object chain tracking system 300 of the FIG. 3.

The nested object chain 401 provided in the example can have its current status readily determined by inspecting the tables 402 and 403. These tables 402 and 403 are regularly updated and maintained dynamically and in real time by the techniques presented herein and above. So, there is no need to manually walk the object chain 401 to resolve statuses.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    associating a global identifier with a global object;
    passing the global identifier to one or more local dependent objects created from a context of the global object;
    receiving status updates from the one or more local dependent objects via the global identifier; and
    updating a different counter for each different status type associated with each of the status updates.

2. The method of claim 1 further comprising, identifying each different status type as at least one of a published status, a draft status, and a closed status.

3. The method of claim 1 further comprising, denying a request to publish the global object to production if at least one of the counter's associated with the status type of draft is greater than zero.

4. The method of claim 1 further comprising, decrementing at least one of the counters associated with the status type of draft by one when one of the local dependent object moves from the status type of draft to the status type of published.

5. The method of claim 1 further comprising, maintaining a list of dependent additional global objects that depend from the global object, wherein each additional global object includes a unique additional global object identifier.

6. The method of claim 5 further comprising, preventing the global object from moving to a published status if any one of the additional global objects is in a draft status.

7. The method of claim 1 further comprising, maintaining a current status for the global object that reflects a least common denominator status selected from the one or more dependent local objects and their current statuses.

8. A method, comprising:
    managing a first table for global objects, wherein the first table includes an entry for each unique global object and each entry including a global identifier, a current status, a draft status count, and a published status count; and
    managing a second table for the global objects, wherein the second table includes a second table entry for select ones of the global identifiers and each second table entry including a particular one of the global identifiers and a list of other global identifiers, which are dependent on that particular global identifier.

9. The method of claim 8 further comprising, dynamically updating the first or second tables in response to at least one of newly added local dependent objects, newly added global objects, changes in statuses associated with dependent local objects, and changes in statuses associated with the global objects.

10. The method of claim 9 further comprising, setting the current status of a particular global object within the first table to draft if the draft status count for that particular global object is greater than zero.

11. The method of claim 9 further comprising, setting the current status of a particular global object within the first table to closed if the draft status and the published status counts are equal to zero.

12. The method of claim 8 further comprising, preventing a particular global object from being published if any dependent global object and its draft count or the particular global object's draft count is greater than zero.

13. The method of claim 8 further comprising, decrementing a particular global object's draft count by one when a dependent local object in a chain of objects associated with the particular global object is moved to a published status and incrementing by one the published count for that particular global object.

14. A system comprising: a processor;
a first status table; and
a second status table, the first status table includes an entry for each unique global object and each entry includes a global identifier, a current status, a draft counter value and a published counter value, and wherein the second status table links each first global object identifiers with other remaining global identifiers if the other remaining global identifiers depend from the first global identifiers.

15. The system of claim 14, wherein the counter values are incremented or decremented within the first table by dependent objects in response to status changes associated with those dependent objects.

16. The system of claim 15, wherein current status of any particular entry is set to draft if the draft counter value is non zero.

17. The system of claim 14, wherein current status of any particular entry is set to closed if both the draft counter and published counter values are equal to zero.

18. The system of claim 14, wherein the current status of any particular entry is set to draft if a dependent global object included in the second table and associated with the global identifier of the particular entry is set to draft.

19. The system of claim 14, wherein any particular global object is prevented from being published if the first table includes a nonzero draft counter value or the second table includes a dependent global object that is set to a draft status.

20. The system of claim 19, wherein the draft counter value for a particular global object is incremented by one for each new dependent local object or new global object that is derived from that particular global object.

* * * * *